(12) United States Patent
Erkelens et al.

(10) Patent No.: US 11,650,421 B1
(45) Date of Patent: May 16, 2023

(54) WEARABLE DISPLAY SOLUTIONS FOR PRESBYOPIC AMETROPIA

(71) Applicant: Meta Platforms Technologies, LLC, Menlo Park, CA (US)

(72) Inventors: Ian Erkelens, Kirkland, WA (US); Larry Richard Moore, Jr., Redmond, WA (US); Kevin James MacKenzie, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/421,076

(22) Filed: May 23, 2019

(51) Int. Cl.
  *G02B 27/01* (2006.01)
  *G06F 3/01* (2006.01)

(52) U.S. Cl.
  CPC ......... *G02B 27/0172* (2013.01); *G06F 3/012* (2013.01); *G06F 3/013* (2013.01); *G02B 2027/014* (2013.01); *G02B 2027/0138* (2013.01); *G02B 2027/0147* (2013.01); *G02B 2027/0178* (2013.01)

(58) Field of Classification Search
  CPC ........ G02B 27/0172; G02B 2027/0138; G02B 2027/014; G02B 2027/0147; G02B 2027/0178; G06F 3/012; G06F 3/013
  See application file for complete search history.

(56) References Cited

U.S. PATENT DOCUMENTS

| | | | | |
|---|---|---|---|---|
| 6,160,576 | A * | 12/2000 | Higuchi | G06T 5/001 348/62 |
| 9,852,496 | B2 * | 12/2017 | Marchand | G06T 5/003 |
| 10,319,154 | B1 * | 6/2019 | Chakravarthula | G06T 19/006 |
| 2011/0018862 | A1 * | 1/2011 | Epps | G06T 13/40 345/419 |
| 2012/0069320 | A1 * | 3/2012 | Simonov | G01C 3/32 356/4.04 |
| 2016/0070105 | A1 * | 3/2016 | Tannoudiji | G02C 7/101 345/8 |
| 2016/0140692 | A1 * | 5/2016 | Pais | G06T 3/4092 345/428 |
| 2016/0189432 | A1 * | 6/2016 | Bar-Zeev | G02B 27/017 345/633 |
| 2017/0200296 | A1 * | 7/2017 | Jones | G06K 9/4652 |
| 2018/0136486 | A1 * | 5/2018 | Macnamara | G06F 1/163 |
| 2018/0357479 | A1 * | 12/2018 | Swaminathan | G06K 9/325 |
| 2020/0241324 | A1 * | 7/2020 | Rakshit | G02C 7/081 |

OTHER PUBLICATIONS

Chakravarthula, FocusAR: Auto-focus Augmented Reality Eyeglasses for both Real and Virtual, DOI: 10.1109/TVCG.2018.2868532 (Year: 2018).*

Chakravarthula, FocusAR: Auto-focus Augmented Reality Eyeglasses for both Real and Virtual, DOI: 10.1109/TVCG.2018.2868532 (Year: 2018), pp. 12 (Year: 2018).*

* cited by examiner

*Primary Examiner* — Phuc N Doan
(74) *Attorney, Agent, or Firm* — Foley & Lardner LLP

(57) ABSTRACT

A method may include identifying, by one or more processors, an object in a field of view of a wearable display, where the object is identified for a presbyopic compensation. The presbyopic compensation is performed by the one or more processors on image data of the object to generate compensated image data of the object. The one or more processors render an image in response to the compensated image data of the object on a display of the wearable display.

21 Claims, 5 Drawing Sheets

WEARABLE DISPLAY SOLUTIONS FOR PRESBYOPIC AMETROPIA

The present disclosure relates generally to wearable display systems and corresponding methods.

BACKGROUND

Presbyopic ametropia is an age-related visual impairment. Presbyopia is farsightedness caused by loss of elasticity of the lens of the eye, occurring typically in middle and old age. Presbyopia results from the natural decrease in the eye's ability to change its focus from distant to near objects due to a slow, progressive hardening of the intraocular lens, which provides the eye's natural varifocal system. The process of changing the intraocular lens shape in order to change the focal point of the eye is known as accommodation. At birth the eye can accommodate from optical infinity (0 diopters or 0 D) to nearly 5 cm (19 D). As the intraocular lens hardens with age, the maximum amplitude of accommodation recedes at a rate of approximately 1 D per 3 years. At approximately 55 years old, the lens is effectively rigid, and the eye is unable to change its focus at all. The eye is now a fixed-focal system at approximately 0.2 D (resting focus).

Objects closer than the fixed focus of the eye are progressively blurred as the distance from the eye lens to the object is reduced. The optical defocus for a given object or text is the difference between the maximum accommodative amplitude of an eye and the viewing distance.

SUMMARY

Subject matter of the application is related to wearable display technologies that ameliorate the optical effects of aging to change and restore visual acuity/quality of near text/objects. Using wearable display technologies (e.g. any HMD or all-day wearable AR glasses), the solution can capture an image of the text/object a user with presbyopia wishes to see more clearly using external facing sensors/devices and re-render this image on a display(s). According to some implementations, a display system includes a detector for automatically identifying text or an object for presbyopic compensation or an interface for receiving a user's selection of text or an object for presbyopic compensation, a processor for performing the compensation, and a display for displaying a compensated image including the text or object. The compensation can move a virtual image of the text or object to a focal distance for better viewing of the text or object on the display, it can include contrast enhancement of the text or object, resize the text or object, change background colors associated with the text or object, adjust brightness associated with the image of the text or object, or combinations thereof. If the image of the text is rendered at an optical distance to which the user can properly focus, the rendering will reduce/eliminate the defocus, and in some implementations, adding back high spatial frequency information and improving visual acuity as well.

The text or object, in some implementations, can be identified automatically without a user actively selecting the text or object, and without head or eye tracking. A plurality of objects may be automatically identified based on spectral decomposition of images of the objects, and the objects being within a distance range where viewing the objects would be expected to be affected by presbyopic ametropia. Depth sensors may be used to determine the distance to the objects. The degree of presbyopic ametropia may be determined based on user information, such as the specific presbyopic ametropia for the user, or information on the age of the user. High frequency information, such as text, may be identified based on the spectral decomposition of the objects. The high frequency information may be identified as to be subject to presbyopic compensation. The depth sensors may determine objects or text distance, and based on the detected distance, objects or text that would be in the range of presbyopic defocus would be identified for rendering to compensate for the defocus. The spatial frequency content attributes of the image of the identified objects or text may be rendered to compensate for the presbyopic defocus. Thus, the processing may apply an image filter to an object or text, and sharpen the edges of the object or text within the range of presbyopic defocus.

In other implementations manual selection, such as via voice or hand input, is provided. The automatic identification may be turned on or off, as desired. Depth sensors, eye tracking sensors and/or cameras can be used to determine which text or object the user would need to be compensated and automatically compensate the text or object. The display system can store a user profile indicative of the visual performance of the user for identifying the depth of focus for texts or objects that require compensation. Also, physiological reactions (e.g., squinting, pupil changes, reading eye movements, etc.) can be sensed to identify whether a user is having difficulty reading text or viewing an object. The image can be rendered in a 'world-locked' format as an overlay to the existing real-world text/object and compensation is provided to effectively increase the contrast which will improve letter recognition thresholds on its own. If the image of the text is rendered at an optical distance to which the user can properly focus, the rendering will reduce/eliminate the defocus, adding back high spatial frequency information and improving visual acuity as well. The image can be rendered in a 'gaze-locked' format to a fixed position on the display and the user can use head movements, eye movements or both to place the image on a suitable background. In some implementations, local or global dimming of the display (Augmented Reality (AR)) can be used to create a suitable background. The image can also be presented in a world locked format overlaid onto existing content.

An aspect of the present disclosure relates to a method. The method may include identifying, by one or more processors, an object in a field of view of a wearable display, where the object is identified for presbyopic compensation. The presbyopic compensation is performed by the one or more processors on image data of the object to generate compensated image data of the object. The one or more processors render an image in response to the compensated image data of the object on a display of the wearable display. A plurality of objects may be identified based on spectral decomposition of an image of the object. The plurality of objects may further be identified based on a range of the objects.

Another aspect of the present disclosure relates to a non-transitory computer-readable medium comprising processor-executable instructions that when executed by one or more processors, cause the one or more processors to perform functions. The functions may include capturing an image of the augmented reality environment comprising an object in a range of focal distance associated with presbyopic ametropia of a user. The functions may further include identifying the object in the image of the augmented reality environment. The functions may further include rendering an image of the object on an augmented reality display with one of an enhanced image contrast or at a focal distance outside of the range.

Another aspect of the present disclosure relates to a system. The system may include a camera of a wearable display and one or more processors. The system may include one or more depth sensors to determine the depth of an object. The cameras may be configured to capture first image data associated with a first image of an environment. The one or more processors may be configured to identify an object in the image for presbyopic compensation. The one or more processors may be configured to render a second image on the wearable display, wherein the second image comprises a rendering of the object with the presbyopic compensation. The functions may further include enhancing any high frequency visual data in the overall scene.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
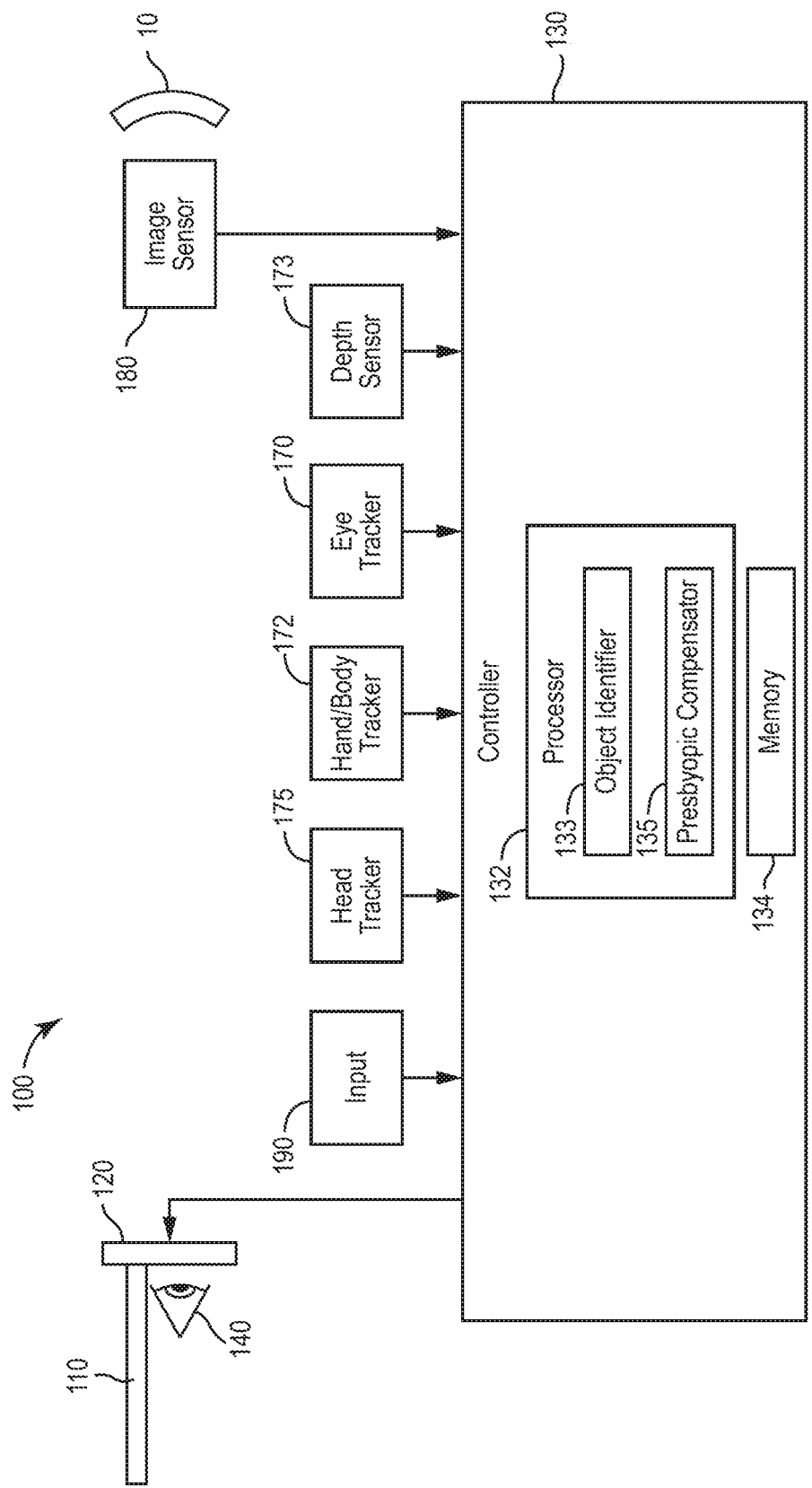
FIG. 1 is a schematic illustrating a wearable display system according to an implementation of the present disclosure.

According to implementations, presbyopic ametropia is addressed through presbyopic compensation on image data associated with an object to generate compensated image data of the object, and an image is rendered in response to the compensated image data on a display of a wearable display. In some embodiments, objects for presbyopic compensation may be identified in the image data of a scene being viewed by a user. The objects for presbyopic compensation can be identified by characteristics of the image data associated with the objects including but not limited to: size, contrast with background, and focal range.

In some embodiments, systems and methods can increase text recognition of the user which is affected by dioptric defocus and contrast between text and text background. The dioptric or optical defocus is provided by Equation 1:

$$\text{Dioptric Defocus} = \left(\frac{1}{\text{Content Distance}(m)}\right) - \text{Maximum Amplitude of Accommodation}(D),$$

where the content distance is the distance from the eye to the text being viewed. The Maximum Amplitude of Accommodation is 25−(0.4*age(in years)). The Minimum Amplitude of Accommodation is 15−(0.25*age(in years)). The Average Amplitude of Accommodation is 18.5−(0.3*age(in years)). Typical text reading distances for analog (paper) or digital media is between 25-75 cm corresponding to a dioptric range of 1.33 D-5 D. From Equation 1 a typical 55-year-old has between 1.1 and 4.8 D of defocus when attempting to read text or consume media at near distances. Some amount of compensation may be achieved by use of reading glasses for near distances.

The effect of defocus on high contrast letter recognition acuity can be estimated using Equation 2: Reduction Snellen Visual Acuity (#Lines)=10*Log (1+Dioptric Defocus$^2$). At 1.1 D of defocus (75 cm content for a 55 year old), the Snellen visual acuity is approximately 20/50. At 4.8 D of defocus (25 cm content for a 55 year old), the Snellen visual acuity of is worse than 20/400 (13 lines reduced from 20/20). Typical text size of book or newsprint is approximately equivalent to 20/40-20/50 Snellen visual acuity at typical reading distances of approximately 50 cm. Therefore, text which is at near distances is generally not discernable, let alone readable for the age group of a typical 55-year-old under these conditions. There is ample data also indicating that reading performance is equally impacted, depending on font size, with defocus. Thus, the defocus can have a significant effect on high contrast letter recognition acuity for persons with presbyopic ametropia.

Letter recognition is further reduced by lower contrast between text and background. Optical defocus is effectively low-pass filtering an image, removing high spatial frequency information. As contrast is reduced in lower ambient lighting conditions, the above impact of defocus on letter recognition is amplified even in the absence of the reduction in depth of field from pupil dilation in dimmer environments. Thus, in lower lighting conditions, the minimum resolvable text size is significantly larger than what is predicted by Equation 2.

In some embodiments, systems and methods address both defocus issues and contrast issues.

FIG. 1 is a schematic illustrating a wearable display system 100. The display system 100 can include a head attachment region 110, a controller 130, a display 120, and an image sensor 180. The system 100 may further include an input device 190, an eye tracker 170, hand/body tracker 172, and a head tracker 175. The wearable display system 100 may be an augmented reality system or a virtual reality system in some embodiments. The display 120 may be monocular or binocular, for example, and may include a projector system, for example. The eye tracker 170 tracks the position and orientation of the user eye 140. The head tracker 175 tracks the position and orientation of the user head. The hand/body tracker 172 tracks the position of a user's hand and/or body. The input 190 device receives input from a user. The image sensor 180 may provide a depth determining function of the object 10, or a separate depth sensor may be used for determining the depth.

The image sensor 180 may capture an image including an object 10. The object 10 may be identified for presbyopic compensation by the wearable display system 10. The image sensor 180 may be one or more cameras, for example, or a depth sensor. The cameras may be visible light cameras (e.g., color or black and white), infrared cameras, or combinations thereof, for example. In some embodiments, the image sensor 180 is configured to provide image data of an environment including the object 10 to the controller 130. In some embodiments, the image sensor 180 is a source of image data, such as computer-generated image data associated with a virtual reality environment including the object 10.

Referring to FIG. 1, the controller 130 may include a processor 132 and a memory 134. The controller 130 controls the eye tracker 170 to determine the orientation and position of the user eye 140, and may control the head tracker 175 to determine the orientation and position of the user head. The controller 130 further controls the display 120 and provides rendered image data to the display 120 to display a rendered image on the display 120. Still further, the controller 130 may control the display 120 to display an overlay image on the display 120.

The processor 132 may include an object identifier 133 and a presbyopic compensator 135 to perform functions of the processor 132. The object identifier 133 performs functions regarding identifying the object 10, while the presbyopic compensator 135 performs functions regarding performing presbyopic compensation on image data of the object. For example, the object identifier 133 may perform detection and/or selection functions to identify an object, control scanning by the image sensor 180 for objects in particular focal regions where a user is looking, and for text, analyzing if the text is readable based upon contrast and text size. The object identifier may automatically identify an object based on the object being detected to be in a range that would be defocused, and a spectral decomposition of an image of the object. Further as an example, the presbyopic compensator 135 may perform compensation, including for example, contrast enhancement, size enhancement, or providing an image of the object to be within an improved focal range. The functions performed by the object identifier 133 and the presbyopic compensator 135 are described in further detail below.

The display 120 provides an image which can be seen by the user eye 140 based on an image rendered by the processor 132 of the controller 130. The user eye 140 and the object 10 are not part of the system 100. The display 120, for example, may be a liquid crystal display (LCD) with combiner optics in some embodiments. In general the display 120 may be any type of near field display system, or any system that projects photons into the eye.

At least some of the processor 132 of the controller 130 can be implemented using a graphics processing unit (GPU). The functions of the processor 132 can be executed in a distributed manner using a plurality of sub processors. The processor 132 may include one or more circuits, and/or hardware components. The processor 132 may implement any logic, functions or instructions to perform any of the operations described herein. The processor 132 can include any type and form of executable instructions executable by any of the circuits, or hardware components. The executable instructions may be of any type including applications, programs, services, tasks, scripts, libraries processes and/or firmware.

The object identifier 133 of the processor 132 may identify the object 10 whose image is to be subject to presbyopic compensation by the presbyopic compensator 135 of the processor 132. The object 10 may be identified in a number of ways, including both active input by a user or passive. The object 10 may be identified based on the object being identified as interacting with the object 10. The system, for example, could determine that user is holding or moving the object, or is making some identifiable gesture regarding the object 10 based on input from the hand/body tracker 172 tracking the hand. The object 10 may be identified based on a user's selection of the object 10 via the input device 190. The input device 190 may be a touchpad or button for example. The object 10 may be identified based on the gaze of the eye 140 to determine what object a user intends to look at, where the gaze may be determined based on data from the eye tracker 170 and head tracker 175, and based on depth detection of the object 10 by the image sensor 180 or separate depth sensors. For objects 10 which are significantly out of focus, and toward which the eye is gazing, the object may be identified for presbyopic compensation by the processor 132. Any number of objects 10 can be identified within a range scanned by the image sensor 180 for objects in particular focal regions where a user is looking.

In some embodiments, the eye tracker 10 senses whether the eye 40 is experiencing focusing difficulties to determine if presbyopic compensation is necessary for the object. For example, if the gaze is determined, based on a detected pupil size and fixational stability of an eye, to be in the direction of the object 10, the processor 132 identifies the object 10 as an object for presbyopic compensation. In another example, if the user is gazing at the object for a period of time and the object 10 is in a focal range associated with presbyopia, the object identifier 133 of the processor 132 identifies the object 10 as an object for presbyopic compensation. In yet another example, if the user's gaze and eye movements are associated with textual reading and the object 10 is in a focal range associated with presbyopia, the object identifier 133 of the processor 132 identifies the object 10 as an object for presbyopic compensation. The object identifier 133 may analyze whether the text is readable based upon contrast and text size.

The object 10 may be identified based on depth detection using artificial intelligence. In some embodiments, the object identifier 133 can be trained using data from the eye tracker 170, the head tracker 175, the depth of focus, and the contrast associated with the object 10.

The object 10 may be identified automatically based on a Fourier transform (or other mathematical image decomposition methods) of the image detected by the image sensor 180, and the spectral decomposition of an image of the object 10 may be obtained. High frequency information, for example text, may be identified as to be subject to presbyopic compensation. A user may set the amount of presbyopic compensation to be performed. The object 10, which may be text, can be identified automatically without a user actively selecting the text or object, and without head or eye tracking. A plurality of objects 10 may be automatically identified based on spectral decomposition of images of the objects 10, and the objects 10 being within a distance range where viewing the objects would be expected to be affected by presbyopic ametropia. Depth sensors, such as image sensor 180, may be used to determine the distance to the objects 10. The degree of presbyopic ametropia may be determined based on user information, such as the specific presbyopic ametropia for the user, or information on the age of the user. High spatial frequency information, such as text, may be automatically identified based on the spectral decomposition of the objects. The high spatial frequency information may be identified as to be subject to presbyopic compensation. The depth sensors may determine objects distance, and based on the detected distance, objects 10 that would be in the range of presbyopic defocus would be identified for rendering to compensate for the defocus. The spatial frequency content attributes of the image of the identified objects 10 may be rendered to compensate for the presbyopic defocus. Thus, the processing may apply an image filter to an object 10, and sharpen the edges of the object 10 within the range of presbyopic defocus.

The object 10 may be identified based on a set of environmental criteria. The environmental criteria may include the depth of the object 10, and the type of objects to be identified, such as text, shape or color, for example. The objects 10 selected may be based on the distance of the objects 10 from the eye 140. For example, any objects 10 within a range which would be expected to have the presbyopic effect may be identified as to be subject to the presbyopic compensation. In this regard, the memory 134 may include a range of focal distances associated with presbyopic ametropia of a user. The object 10 may be identified by sensing an eye parameter, such as pupil size or fixational stability. The eye parameter may be associated with reading or attempting to focus at a depth associated with presbyopic ametropia of a user, for example.

Once the object 10 has been identified as to be subject to the presbyopic compensation by the object detector 133 of the processor 132, the processor 132 renders an image including the object 10 for display on the display 120. The rendered image is based on an image and image data captured by the image sensor 180. In this regard, the image sensor 180 captures first image data associated with a first image of an environment, an object 10 is identified for presbyopic compensation, and the processor 132 renders a second image on the display 120 where the second image comprises a presbyopic compensated rendering of the object 10 which is identified.

Figure 2:
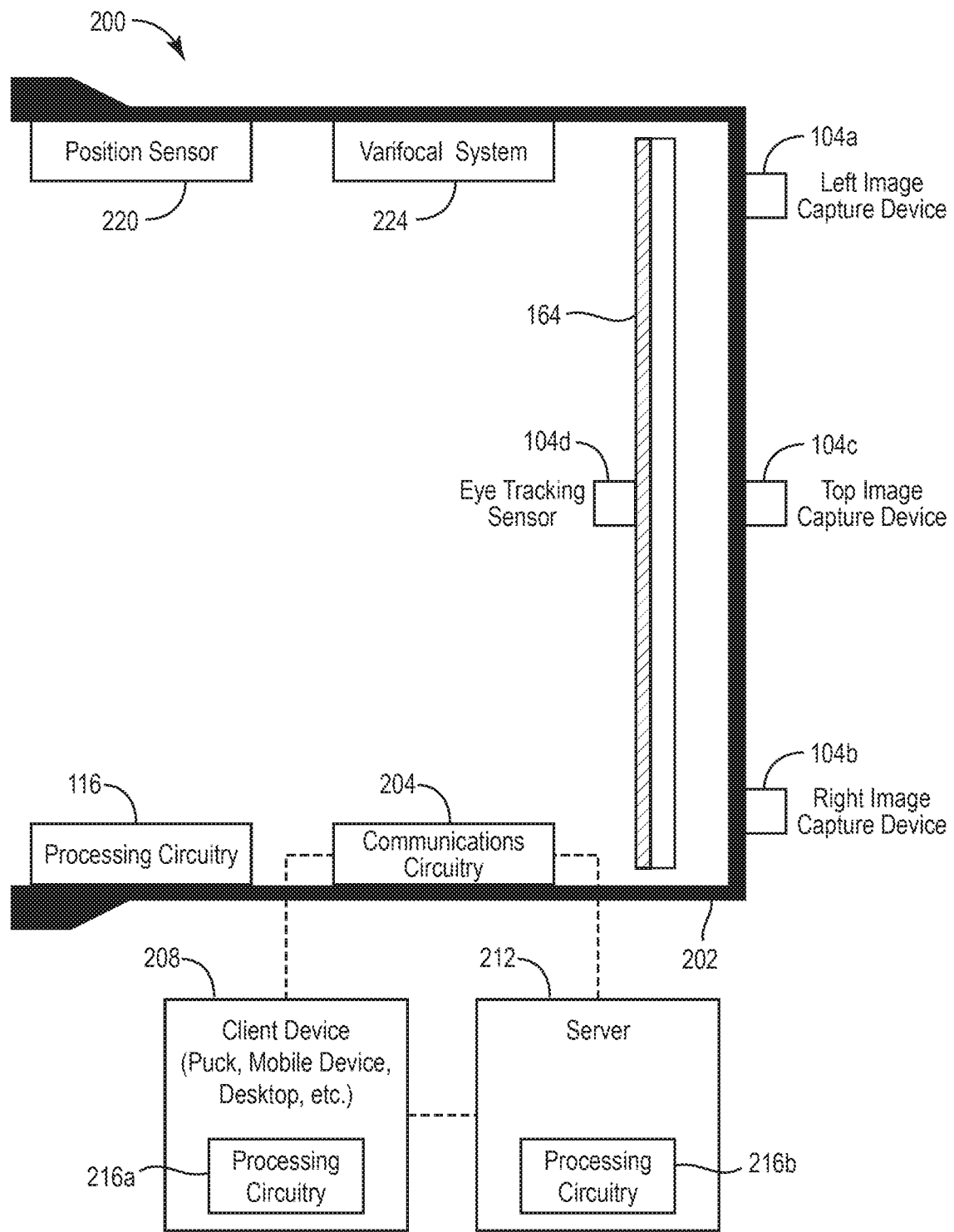
FIG. 2 is a schematic diagram of a head-mounted display (HMD) system according to an implementation of the present disclosure.

Referring now to FIG. 2, in some implementations, an HMID system 200 can be used to implement the system 100. The HMID system 200 can include an HMD body 202, a left sensor 104a (e.g., left image sensor), a right sensor 104b (e.g., right image sensor), and the display 164. The HMID body 202 can have various form factors, such as glasses or a headset. The sensors 104a, 104b can be mounted to or integrated in the HMID body 202. The left sensor 104a can capture first images corresponding to a first view (e.g., left eye view), and the right sensor 104b can capture images corresponding to a second view (e.g., right eye view).

The HMD system 200 can include a top sensor 104c (e.g., top image sensor). The top sensor 104c can capture images corresponding to a third view different than the first view or the second view. For example, the top sensor 104c can be positioned between the left sensor 104a and right sensor 104b and above a baseline between the left sensor 104a and right sensor 104b. This can enable the top sensor 104c to capture images with depth information that may not be readily available to be extracted from the images captured by the left and right sensors 104a, 104b. For example, it may be difficult for depth information to be effectively extracted from images captured by the left and right sensors 104a, 104b in which edges (e.g., an edge of a table) are parallel to a baseline between the left and right sensors 104a, 104b. The top sensor 104c, being spaced from the baseline, can capture the third image to have a different perspective, and thus enable different depth information to be extracted from the third image, than the left and right sensors 104a, 104b. Thus the three sensors 104a, 104b and 104c may function as a depth sensor, or a single depth sensor could be employed, and both could be used in conjunction to provide an even more accurate depth map of a users world-viewpoint. While the HMD system 200 of FIG. 2 illustrates three sensors 104a, 104b and 104c, in general the system 200 is not limited to three sensors. In some embodiments, the number of sensors 104 may be a single sensor, two sensors, or more than three sensors.

The HMD system 200 can include processing circuitry 116 (for example, including processor 132 in FIG. 1), which can perform at least some of the functions described with reference to FIG. 1, including receiving sensor data from the sensors 104a, 104b, and 104c as well as eye tracking sensors 104, and processing the received images to calibrate an eye tracking operation.

The HMD system 200 can include communications circuitry 204. The communications circuitry 204 can be used to transmit electronic communication signals to and receive electronic communication signals from at least one of a client device 208 or a server 212. The communications circuitry 204 can include wired or wireless interfaces (e.g., jacks, antennas, transmitters, receivers, transceivers, wire terminals) for conducting data communications with various systems, devices, or networks. For example, the communications circuitry 204 can include an Ethernet card and port for sending and receiving data via an Ethernet-based communications network. The communications circuitry 204 can communicate via local area networks (e.g., a building LAN), wide area networks (e.g., the Internet, a cellular network), and/or conduct direct communications (e.g., NFC, Bluetooth). The communications circuitry 204 can conduct wired and/or wireless communications. For example, the communications circuitry 204 can include one or more wireless transceivers (e.g., a Wi-Fi transceiver, a Bluetooth transceiver, a NFC transceiver, a cellular transceiver). For example, the communications circuitry 204 can establish wired or wireless connections with the at least one of the client device 208 or the server 212. The communications circuitry 204 can establish a USB connection with the client device 208.

The HMD system 200 can be deployed using different architectures. In some embodiments, the HMD (e.g., HMD body 202 and components attached to the HMD body 202) comprises the processing circuitry 116 and is self-contained portable unit. In some embodiments, the HMD has portions of the processing circuitry 116 that work in cooperation with or in conjunction with any type of portable or mobile computing device or companion device that has the processing circuitry or portions thereof, such as in the form of a staging device, a mobile phone or wearable computing device. In some embodiments, the HMD has portions of the processing circuitry 116 that work in cooperation with or in conjunction with processing circuitry, or portions thereof, of a desktop computing device. In some embodiments, the HMD has portions of the processing circuitry 116 that works in cooperation with or in conjunction with processing circuitry, or portions thereof, of a server computing device, which may be deployed remotely in a data center or cloud computing environment. In any of the above embodiments, the HMD or any computing device working in conjunction with the HMD may communicate with one or more servers in performing any of the functionality and operations described herein.

The client device 208 can be any type and form of general purpose or special purpose computing device in any form factor, such as a mobile or portable device (phone, tablet, laptop, etc.), or a desktop or personal computing (PC) device. In some embodiments, the client device can be a special purpose device, such as in the form of a staging device, which may have the processing circuitry or portions thereof. The special purpose device may be designed to be carried by the user while wearing the HMD, such as by attaching the client device 208 to clothing or the body via any type and form of accessory attachment. The client device 208 may be used to perform any portion of the image and rendering processing pipeline described in connection with FIGS. 1 and 6. The HMD may perform some or other portions of the image and rendering processing pipeline such as image capture and rendering to the display 164. The HMD can transmit and receive data with the client device 208 to leverage the client device 208's computing power and resources which may have higher specifications than those of the HMD.

The server 212 can be any type of form of computing device that provides applications, functionality or services to one or more client devices 208 or other devices acting as clients. In some embodiments, the server 212 can be a client device 208. The server 212 can be deployed in a data center or cloud computing environment accessible via one or more networks. The HMD and/or client device 208 can use and leverage the computing power and resources of the server 212. The HMD and/or client device 208 can implement any portion of the image and rendering processing pipeline described in connection with FIGS. 1 and 6. The server 212 can implement any portion of the image and rendering processing pipeline described in connection with FIGS. 1 and 6, and in some cases, any portions of the image and rendering processing pipeline not performed by client device 208 or HMD. The server 212 may be used to update the HMD and/or client device 208 with any updated to the applications, software, executable instructions and/or data on the HMD and/or client device 208.

The system 200 can include a position sensor 220. The position sensor 220 can output at least one of a position or an orientation of the body 202, and thus may function as a position sensor and/or orientation sensor. As the image capture devices 104a, 104b, 104c can be fixed to the body 202 (e.g., at predetermined locations relative to the position sensor 220), the position sensor 220 can output at least one of a position or an orientation of each sensor 104a, 104b, 104c. The position sensor 220 can include at least one of an inertial measurement unit (IMU), an accelerometer, a gyroscope, or a magnetometer (e.g., magnetic compass). The processing circuitry 116 may further include at least one of the head tracker 175 or eye tracker 170 of FIG. 1.

The system 200 can include a varifocal system 224. The system 200 is not limited to including a varifocal system, and may be a fixed focal system. The varifocal system 224 can have a variable focal length, such that the varifocal system 224 can change a focus (e.g., a point or plane of focus) as focal length or magnification changes. The varifocal system 224 can include at least one of a mechanical lens, liquid lens, or polarization beam plate. The varifocal system 224 can be calibrated by the processing circuitry 116 (e.g., by calibrator 132), such as by receiving an indication of a vergence plane from the calibrator 132 which can be used to change the focus of the varifocal system 224. In some embodiments, the varifocal system 224 can enable a depth blur of one or more objects in the scene by adjusting the focus based on information received from the calibrator 132 so that the focus is at a different depth than the one or more objects.

Figure 3:
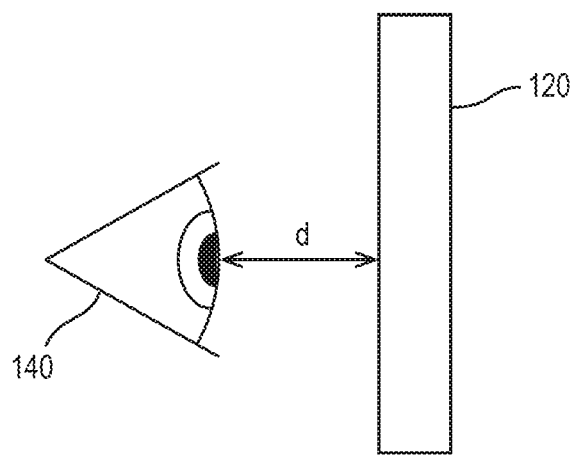
FIG. 3 illustrates an arrangement where the display is an optical distance from the eye according to an implementation of the present disclosure.

Referring to FIG. 3, FIG. 3 illustrates an arrangement where the display is an optical distance from the eye 140. In use, the display 120 is worn by a user, and the distance from the eye 140 of the user to the display 120 is a first optical distance d. The rendering performed by the processor 132 may be done at a focal plane where the user eye may naturally and comfortably accommodate to. For example, if the display 120 is a fixed-focal display at 0.5 D, the optical distance is set to achieve 0.5 D. Thus, the first optical distance d may be set to match with the resting focus of the presbyopic eye. In general, the first optical distance d is different than the real world distance from the eye 140 to the object 10. The processor 132 may use compensated image data generated by the presbyopic compensator 135 of the processor 132 and render an image of the object 10 to be displayed where the rendered image of the object 10 is larger than a real world view of the object 10.

Figure 4:
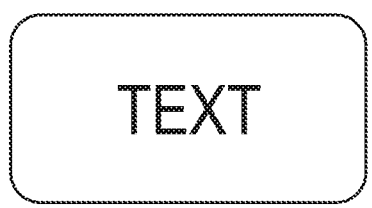
FIG. 4 illustrates an arrangement where the identified object is text having a dark color with a light background according to an implementation of the present disclosure.

The processor 132 may render the image of the object 10 displayed on the display 120 in a world locked mode, a head locked mode, or a gaze locked mode. In word locked mode, the rendered image may be an overlay which is fixed to the identified object 10 in physical space. In world locked mode the overlay stays fixed to the identified object 10 in physical space and does not move on the display 120 merely based on tracking the eye or head. The identified object 10 may be text, for example. FIG. 4 illustrates an example of typical text which is printed in dark ink on a light background. In this case, the image rendered would be reverse polarity where only the light or white background at the edge of the text letters (letters "T," "E," "X" and "T" in FIG. 4) is rendered. The rendered image would then be fixed to actual text on the display 120. This rendered overlay enhances the contrast at the edge of each letter, thus improving visual acuity, text legibility and reading speed. Further, the enhanced edge contrast decreases the minimum luminance of the text needed for text legibility. The enhanced edge contrast may further be increased by dimming a background of the display either globally or locally. In addition to edge contrast enhancement, the size of the text may be increased for improved readability. While FIG. 4 illustrates dark text on a light background, the letters may be rendered in any color which contrasts with the background color. Further, the system could decide whether to highlight the background or the text to provide the contrast. The display 120 could be, for example, a monochrome or color display, and the rendering may change the color of the text and/or background.

Figure 5:
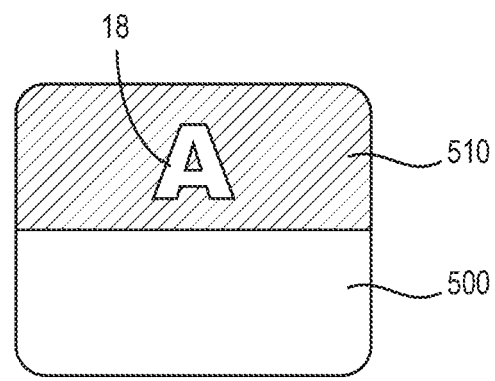
FIG. 5 illustrates an arrangement where the identified object is text which is rendered to be light on a dark background according to an implementation of the present disclosure.

In head locked mode the image is rendered to a fixed area on the display 120, while in gaze locked mode the image is rendered to a specific gaze position on the display 120 as detailed by the eye-trackers 170. A user uses their head movements, or eye movements, or both to place the rendered image onto a desired background on the display 120. FIG. 5 provides the example where the identified object 10 is text, namely the letter "A." In the case of FIG. 5, the user desired background is a darker region 510 instead of a lighter region 500. The text "A" is rendered to be light or white so that there is a contrast between the light "A" and the darker region 510 to improve legibility of the text. Any colors may be used for the text and background as along as the colors provide a contrast. Further, rendering may include changing the colors of the text and/or background, such as to provide or enhance the contrast. Thus, the presbyopic compensation for any of the world locked mode, head locked mode, or gaze locked mode can provide contrast enhancement, and may provide high spatial frequency compensation.

The memory 134 of the controller 130 may store instructions for execution by the processor 132 to provide the functionality of the processor 132 as that functionality is described herein. The memory 134 may include a non-transitory computer-readable medium comprising processor-executable instructions that when executed by the processor 132, which may include one or more processors, cause the one or more processors to perform functions. For example, functions by the processor 132 may include capturing an image of an augmented reality (AR) environment comprising the object 10 in a range of focal distances associated with presbyopic ametropia of a user. The object identifier 133 of the processor, based on the processor-executable instructions, may identify the object 10 in the image of the AR environment, and render an image of the object 10 on an AR display, such as may be the display 120, with an enhanced image contrast or at a focal distance outside of the range. The enhanced image contrast may include dimming a background of the AR display locally or globally.

Figure 8:
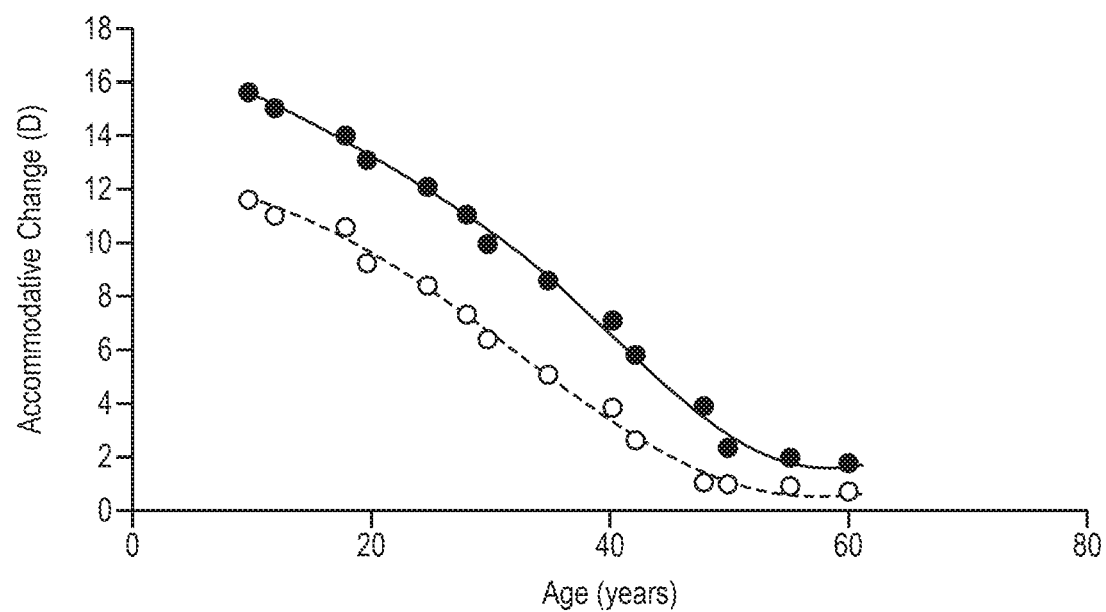
FIG. 8 illustrates an estimate of the maximum and minimum accommodative change in diopters for an eye as a function of age for a user profile according to an implementation of the present disclosure.

The memory 134 may include a user profile, where the range is defined in the user profile for the display 120. The user profile can include a predicted characteristics of the user associated with presbyopia (e.g., based upon age). In some embodiments, the predicted characteristics can be modified in accordance with sensed eye strain (e.g., squinting at objects in particular focal ranges, pupil size fluctuations or eye alignment instability) or based upon user feedback. In some embodiments, the predicted user characteristics include a defocus factor for the user and the defocus factor is used to select the object 10 where presbyopic compensation is desired based upon the focal distance to the object 10 and contrast associated with the object 10. In some embodiments the user profile includes changes in an eye as a function of age, along with a user's age. For example, FIG. 8 illustrates an estimate of the maximum and minimum accommodative change in diopters for an eye as a function of age, where the maximum accommodative change is shown in black, and the minimum accommodative change is shown in gray.

Figure 6:
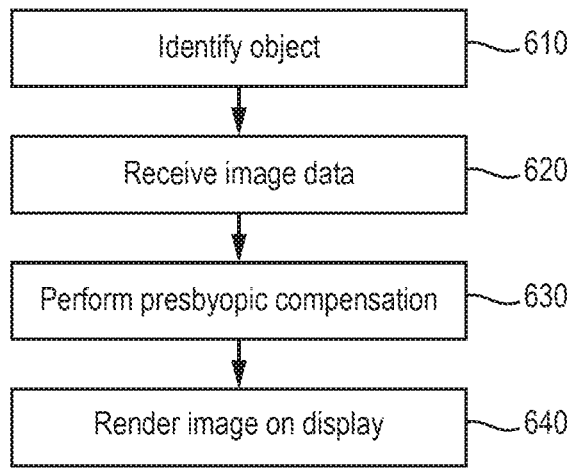
FIG. 6 illustrates a method according to an implementation of the present disclosure.

FIG. 6 illustrates a method according to implementations. The method could be performed, for example, using the system 100. In step 610 the object identifier 133 of the processor 132, which may include one or more processors, identifies the object 10 for a presbyopic compensation. The identification may include the processor 132 receiving identification of the object 10 in response to a user selection of the object 10 or sensing that an object requires compensation. The selection may be performed using an input 190, which may be operated by a user. The object 10 may be identified by gaze sensing a depth of view of the object 10 and determining the depth of view is within a range associated with presbyopic ametropia of a user. The object 10 may be identified by sensing an eye parameter, the eye parameter being associated with one of reading or attempting to focus at a depth associated with presbyopic ametropia of a user. The object 10 may be identified based on depth detection using artificial intelligence. Any number of objects 10 can be identified. The object 10 may be identified based on a set of environmental criteria. The environmental criteria may include the depth of the object 10, and the type of objects to be identified, such as text, shape or color. The object 10 may be identified automatically without a user actively selecting the object 10, and without head or eye tracking. One or more objects 10 may be automatically identified based on spectral decomposition of images of the objects 10, and the objects 10 being within a distance range where viewing the objects would be expected to be affected by presbyopic ametropia.

In step 620, the processor 132 receives image data of the object 10 from the image sensor 180. The image sensor 180 may comprise one or more cameras, for example. Step 620 and 610 are performed in reverse order or simultaneously in some embodiments.

In step 630, the presbyopic compensator 135 of the processor 132 performs presbyopic compensation on the image data of the object 10 to generate compensated image data of the object 10. The presbyopic compensation may include contrast enhancement. The compensated image data may provide the object at a larger size than a real world view of the object 10, or of a desired color to improve contrast. Changing the color may improve overall sensitivity. For example, if the original color is one color, the compensated image may be rendered in another color to which the system is more sensitive.

In step 640 the processor 132 renders an image in response to the compensated image data of the object on the display 120. The rendering may include rendering the image of the object 10 in a field of view at a first optical distance to a user in response to the compensated image data. The first optical distance may be different than a real world optical distance. The object may include text where the text is rendered on a light or white background, and may be colored. The light or white background may be provided at the edges of the letters associated with the text. The image of the object 10 may be rendered in response to the compensated image data being in a world locked or gaze locked mode.

According to certain implementations, the described technology can reduce strain and discomfort experienced during prolonged reading tasks for individuals with presbyopia that are focusing on text/objects that are still within the maximum range of accommodation. Fatigue, drowsiness and discomfort are all symptoms associated with straining to maintain proper focus at near range as the amplitude of accommodation reduces with age. The described technology can be used to augment the visual environment in such a way as to prevent or prolong the onset of these symptoms by reducing the strain/effort required to focus at near range.

Figure 7:
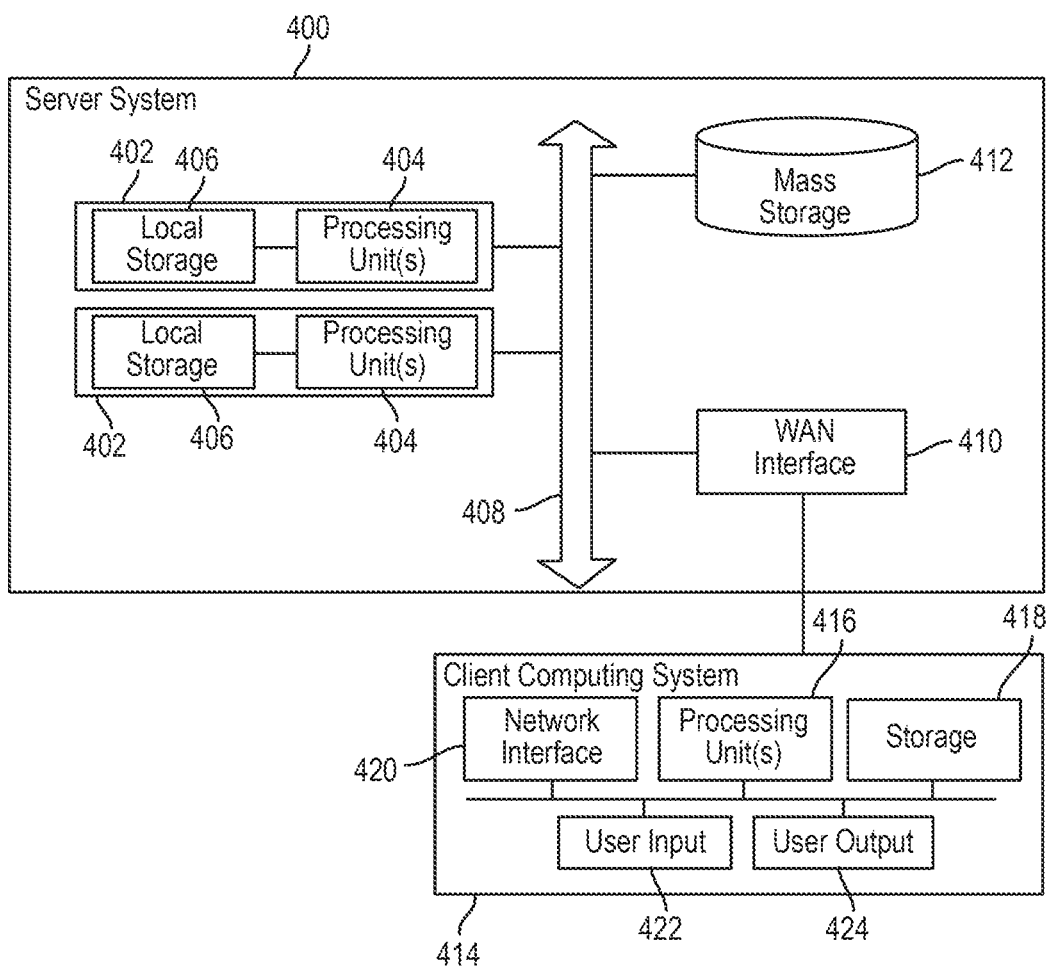
FIG. 7 is a block diagram of a computing environment according to an implementation of the present disclosure.

Various operations described herein can be implemented on computer systems. FIG. 7 shows a block diagram of a representative server system 400 and client computer system 414 usable to implement the present disclosure. Server system 400 or similar systems can implement services or servers described herein or portions thereof. Client computer system 414 or similar systems can implement clients described herein. Each of the systems 100, 200 and others described herein can incorporate features of the systems 400, 414.

Server system 400 can have a modular design that incorporates a number of modules 402 (e.g., blades in a blade server); while two modules 402 are shown, any number can be provided. Each module 402 can include processing unit(s) 404 and local storage 406.

Processing unit(s) 404 can include a single processor, which can have one or more cores, or multiple processors. Processing unit(s) 404 can include a general-purpose primary processor as well as one or more special-purpose co-processors such as graphics processors, digital signal processors, or the like. Some or all processing units 404 can be implemented using customized circuits, such as application specific integrated circuits (ASICs) or field programmable gate arrays (FPGAs). Such integrated circuits execute instructions that are stored on the circuit itself. Processing unit(s) 404 can execute instructions stored in local storage 406. Any type of processors in any combination can be included in processing unit(s) 404.

Local storage 406 can include volatile storage media (e.g., conventional DRAM, SRAM, SDRAM, or the like) and/or non-volatile storage media (e.g., magnetic or optical disk, flash memory, or the like). Storage media incorporated in local storage 406 can be fixed, removable or upgradeable as desired. Local storage 406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Local storage 406 can store one or more software programs to be executed by processing unit(s) 404, such as an operating system and/or programs implementing various server functions such as functions of the system 100, or any other system described herein, or any other server(s) associated with the system 100 or any other system described herein.

"Software" refers generally to sequences of instructions that, when executed by processing unit(s) 404 cause server system 400 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (interconnect 408) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

Local storage 406 can provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. Additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Conventional work allocation techniques can be used. As requests are processed, results can be returned to the requester via WAN interface 410. Such operation can generally be automated. WAN interface 410 can connect multiple server systems 400 to each other, providing scalable systems capable of managing high volumes of activity. Conventional or other techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 7 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include conventional computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processor 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400 of a message management service such as accessing messages, performing actions on messages, and other interactions described above. Some client computing systems 414 can also interact with a messaging service independently of the message management service.

Network interface 420 can provide a connection to a wide area network (e.g., the Internet) to which WAN interface 410 of server system 400 is also connected. Network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include a display to display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality associated with message management services.

It will be appreciated that server system 400 and client computing system 414 are illustrative and that variations and modifications are possible. Computer systems used in connection with the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   identifying, by one or more processors, an object in a field of view of a wearable display from image data of the field of view detected by one or more sensors, wherein identifying the object comprises:
   identifying a range of focal distance of the object using the image data detected by the one or more sensors; and
   identifying the object for a presbyopic compensation based on the range of focal distance being associated with a presbyopic condition, wherein the range being associated with the presbyopic condition is determined based on information regarding a user stored in a user profile, wherein the user profile comprises a predicted characteristic of an eye as a function of action and the user's age;
   performing, by the one or more processors, the presbyopic compensation on the image data of the object to generate compensated image data of the object; and
   rendering, by the one or more processors, an image in response to the compensated image data of the object on a display of the wearable display;
   wherein the object comprises a text object, wherein the text object is identified for the presbyopic compensation based on a spatial frequency of the text object and the predicted characteristic of the user profile.

2. The method of claim 1, wherein a plurality of objects are identified based on spectral decomposition of an image of the object.

3. The method of claim 2, wherein the plurality of objects are further identified based on a range of the objects.

4. The method of claim 1, further comprising receiving, by the one or more processors, the image data of the object from one of the one or more sensors or a camera of the wearable display.

5. The method of claim 1, wherein the presbyopic compensation comprises rendering the image of the object in the field of view at a first optical distance to the user in response to the compensated image data, the first optical distance being different than a real world optical distance.

6. The method of claim 5, wherein the object comprises text of a first color and the text is rendered on a background of a second color.

7. The method of claim 6, wherein the text is rendered to change the first color to a third color.

8. The method of claim 1, wherein the image of the object is rendered in response to the compensated image data in a world locked or gaze locked mode.

9. The method of claim 1, wherein the object is identified by gaze sensing a depth of view of the object and determining the depth of view is within the range associated with presbyopic ametropia of the user.

10. The method of claim 1, wherein the object is identified by sensing an eye parameter, the eye parameter being associated with one of reading or attempting to focus at a depth associated with presbyopic ametropia of the user, or is identified by hand tracking and identifying hand gestures.

11. The method of claim 1, wherein the compensated image data provides the object at a larger size than a real world view of the object.

12. The method of claim 1, wherein performing the presbyopic compensation includes resizing the text object based on the range of the text object.

13. The method of claim 1, wherein the object is identified using one or more physiological reactions comprising at least one of squinting, pupil changes, or read eye movements.

14. A non-transitory computer-readable medium comprising processor-executable instructions that when executed by one or more processors, cause the one or more processors to:
   capture an image of an augmented reality environment comprising an object in a range of focal distance associated with presbyopic ametropia of a user, wherein the range of focal distance associated with presbyopic ametropia is determined based on information in a user profile for the user, wherein the user profile comprises a predicted characteristic of an eye as a function of action and a user's age;

identify the object in the image of the augmented reality environment; and render an image of the object on an augmented reality display with one of an enhanced image contrast or at a focal distance outside of the range;

wherein the object comprises a text object, wherein the text object is identified for presbyopic compensation based on a spatial frequency of the text object and the predicted characteristic of the user profile.

15. The non-transitory computer-readable medium of claim 14, wherein the enhanced image contrast comprises dimming a background of the augmented reality display locally or globally.

16. The non-transitory computer-readable medium of claim 14, wherein the range is defined in the user profile for the augmented reality display.

17. A system, comprising:

a camera of a wearable display configured to capture first image data associated with a first image of an environment; and one or more processors configured to:

identify an object and a range of focal distance of the object in the image for presbyopic compensation based on the range of the object being associated with a presbyopic condition, wherein the range of the object being associated with the presbyopic condition is determined based on information in a user profile for a user, wherein the user profile comprises a predicted characteristic of an eye as a function of action and the user's age; and render a second image on the wearable display, wherein the second image comprises a rendering of the object with the presbyopic compensation;

wherein the object comprises a text object, wherein the text object is identified for the presbyopic compensation based on a spatial frequency of the text object and the predicted characteristic of the user profile.

18. The system of claim 17, wherein the rendering uses a first optical distance to the user for the object in a field of view, the first optical distance being farther than a real world optical distance to the user.

19. The system of claim 17, wherein the rendering provides enhanced contrast for the object compared to a contrast in the environment.

20. The system of claim 19, wherein the rendering provides high spatial frequency compensation for the object.

21. The system of claim 17, wherein the wearable display comprises one of electronic glasses or a head mounted display.

* * * * *